(12) United States Patent
Jarrett

(10) Patent No.: US 8,332,800 B2
(45) Date of Patent: Dec. 11, 2012

(54) METHOD FOR IDENTIFYING REDUNDANT SIGNAL PATHS FOR SELF-GATING SIGNALS

(75) Inventor: Ben D. Jarrett, Austin, TX (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 13/152,975

(22) Filed: Jun. 3, 2011

(65) Prior Publication Data

US 2012/0159410 A1     Jun. 21, 2012

Related U.S. Application Data

(60) Provisional application No. 61/423,240, filed on Dec. 15, 2010.

(51) Int. Cl.
    G06F 17/50  (2006.01)
    G06F 9/455  (2006.01)

(52) U.S. Cl. ........ 716/132; 716/100; 716/101; 716/102; 716/103; 716/104; 716/113; 716/114; 716/133; 716/134; 716/135; 326/93; 326/94

(58) Field of Classification Search .......... 716/100–104, 716/113–114, 132–135; 326/93–94
    See application file for complete search history.

(56) References Cited

U.S. PATENT DOCUMENTS

| 3,018,393 | A | 1/1962 | Levy et al. |
| 5,835,426 | A | 11/1998 | Koura |
| 5,892,687 | A * | 4/1999 | Moricz et al. ................ 716/103 |
| 6,735,751 | B2 | 5/2004 | Furusawa |
| 7,424,689 | B1 * | 9/2008 | Yuan ............................. 716/134 |
| 8,037,443 | B1 * | 10/2011 | Krishnaswamy et al. .... 716/133 |
| 2009/0009210 | A1 | 1/2009 | Te Beest et al. |

\* cited by examiner

Primary Examiner — Nghia Doan

(74) Attorney, Agent, or Firm — Meyertons, Hood, Kivlin, Kowert & Goetzel, P.C.; Lawrence J. Merkel; Stephen J. Curran

(57) ABSTRACT

A method for identifying and removing redundant signal paths includes determining whether a given input to a logic circuit is coupled to both an input of a cone of logic of a data input of a clocked state element and a clock gate circuit that is coupled to disable a clock input to the clocked state element. The method may include removing the given input from the cone of logic such that the given input is no longer coupled to the input of the cone of logic responsive to determining that the given input is coupled to both the input of the cone of logic and the clock gate circuit. The method may include preserving the given input to the clock gate circuit such that the given input continues to be coupled to the clock gate circuit after being removed from the input of the cone of logic.

12 Claims, 5 Drawing Sheets

US 8,332,800 B2

METHOD FOR IDENTIFYING REDUNDANT SIGNAL PATHS FOR SELF-GATING SIGNALS

This patent application claims priority to Provisional Patent Application Ser. No. 61/423,240, filed Dec. 15, 2010, the content of which is herein incorporated by reference in its entirety.

BACKGROUND

1. Technical Field

This disclosure relates to integrated circuit design, and more particularly to signal path optimization.

2. Description of the Related Art

Signal paths on integrated circuits can in many cases be routed through various cones of logic. In addition, various ones of these signals may have a large fan-in or a large fanout. Depending on how large the fan-out, it may be difficult to meet the timing requirements of the particular circuit. This may be particularly true for signals that are common to many parts of the integrated circuit.

More particularly, some signals may inadvertently be redundant in a design. For example, there are cases in which a signal may feed into a cone of logic that leads to a clocked storage or state element such as a flip-flop, for example. This same signal may also be used to gate the clock to the flip-flop. The signal path for that signal through the cone of logic may form a redundant path. This is sometimes referred to as a self-gating signal. This type of redundant path is not easily detectable by conventional design tools. These redundant signals can be problematic particularly when the have a large fanout.

SUMMARY OF THE EMBODIMENTS

Various embodiments of a method for identifying redundant signal paths for self-gating signals are disclosed. Broadly speaking, a method is contemplated in which redundant signal paths may be identified and removed. More particularly, certain redundant paths such as those created by a signal that feeds both an input to a cone of logic of a data input to a clocked state element such as a flip-flop, and a clock gate circuit that is used to gate the same flip-flop may be problematic and therefore identified and removed.

In one embodiment, the method includes determining whether a given input to a logic circuit is coupled to both an input of a cone of logic that is coupled to a data input of a clocked state element and a clock gate circuit that is coupled to disable a clock input to the clocked state element. In addition, the method may include removing the given input from the cone of logic such that the given input is no longer coupled to the input of the cone of logic in response to determining that the given input is coupled to both the input of the cone of logic and the clock gate circuit. Further, the method may include preserving the given input to the clock gate circuit such that the given input continues to be coupled to the clock gate circuit after being removed from the input of the cone of logic.

In one specific implementation, the method may include preserving any remaining inputs to the cone of logic such that any remaining inputs continue to be coupled to the cone of logic after the given input is removed from the input of the cone of logic.

Figure 1:
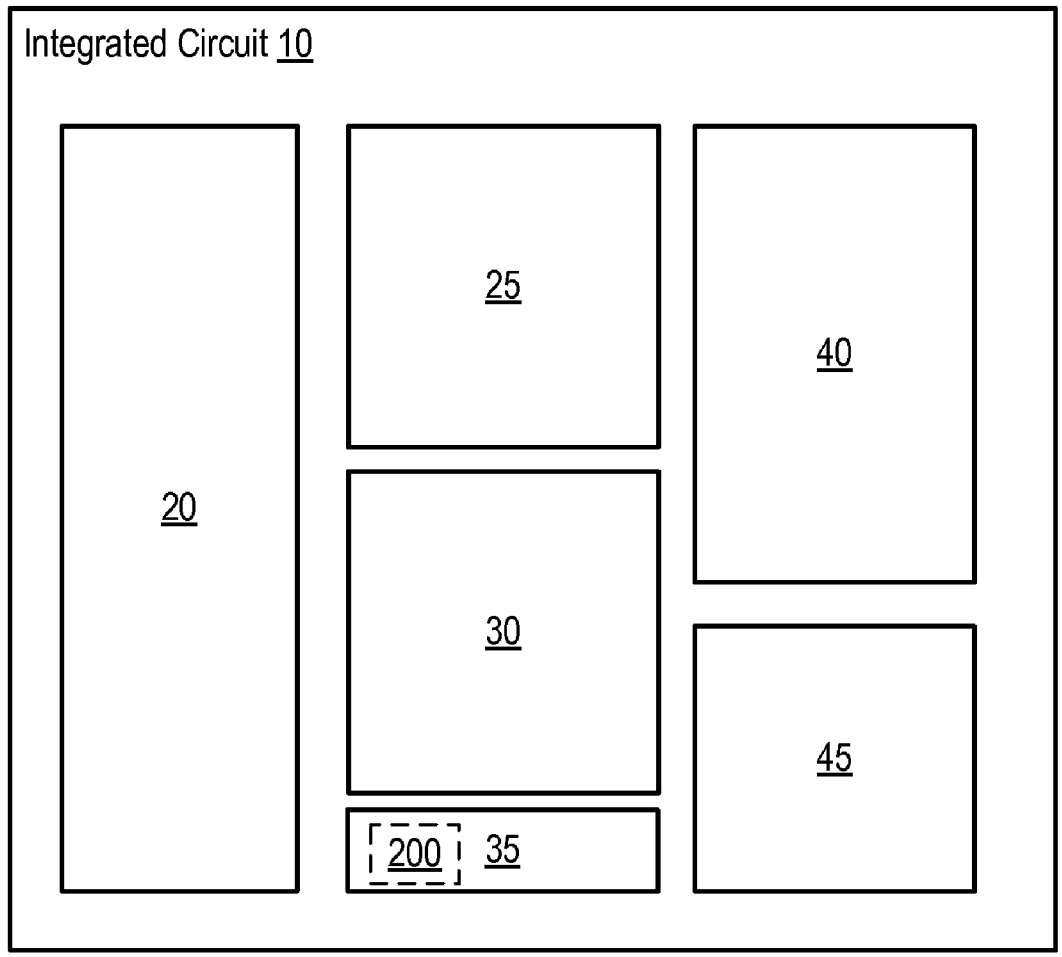
FIG. 1 is a block diagram of one embodiment of an integrated circuit (IC) including various circuit blocks.

Specific embodiments are shown by way of example in the drawings and will herein be described in detail. It should be understood, however, that the drawings and detailed description are not intended to limit the claims to the particular embodiments disclosed, even where only a single embodiment is described with respect to a particular feature. On the contrary, the intention is to cover all modifications, equivalents and alternatives that would be apparent to a person skilled in the art having the benefit of this disclosure. Examples of features provided in the disclosure are intended to be illustrative rather than restrictive unless stated otherwise.

As used throughout this application, the word "may" is used in a permissive sense (i.e., meaning having the potential to), rather than the mandatory sense (i.e., meaning must). Similarly, the words "include," "including," and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. §112, paragraph six, interpretation for that unit/circuit/component.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

DETAILED DESCRIPTION

Turning now to FIG. 1, a layout view of a floorplan of an integrated circuit (IC) is shown. IC 10 includes several circuit blocks that are designated as 20, 25, 30, 35, 40 and 45. These circuit blocks may be representative of any type of circuit block. For example, in one embodiment, IC 10 may be representative of a system on a chip (SOC) such as a processor that includes various functional blocks such as one or more central processing units (CPUs), a memory controller, one or more cache memories, a power management unit, and the like. Accordingly, each of the circuit blocks may include a great number of transistors and signal routing connection wires. In the floorplan of FIG. 1, these transistors have been arranged into the various logic blocks (e.g., 20-45), and the blocks have been arranged according to various design rules.

Figure 2:
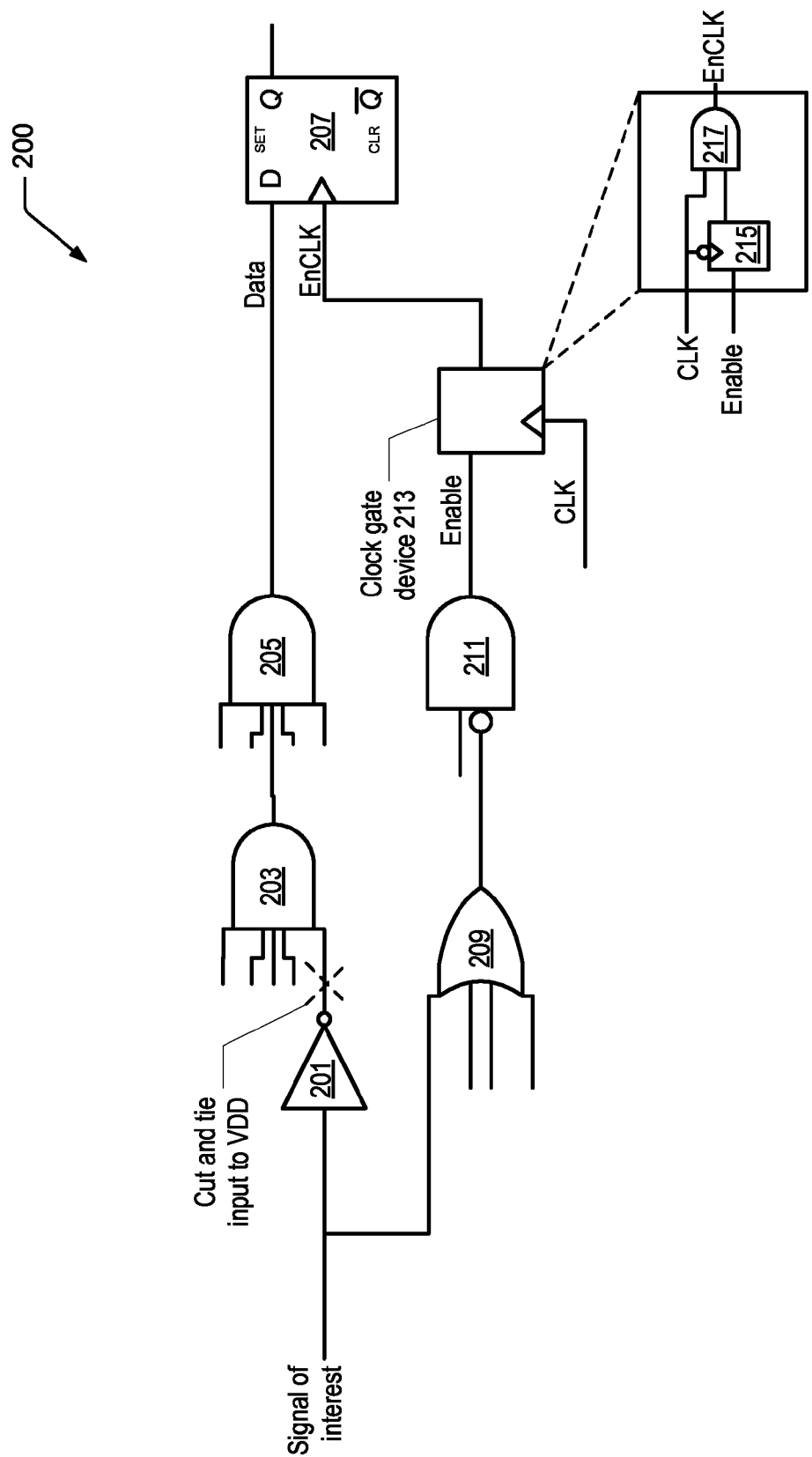
FIG. 2 is an exemplary block diagram of one embodiment of a clock-gated cone of logic.

As mentioned above, signals may be routed in and through the various blocks or portions of the circuit blocks. To save power, various ones of the signals (e.g., clock signals) may be stopped when not in use. Accordingly, in one embodiment clock-gating logic may be used throughout the design to stop one or more of these clocks. In some cases, a gating circuit may have a self-gating signal that forms a redundant path. This can be problematic especially if that signal has a high fanout. Further, conventional circuit design tools have a difficult time detecting this type of circuit optimization since the signal-that-gates-itself relationship is easily obscured by multiple intervening levels of logic. Accordingly, to reduce timing problems that may result from these redundant paths, they must be identified and removed when appropriate. In FIG. 2, a small portion (e.g., 200) of circuit block 35 which includes such a redundant path is shown.

Referring to FIG. 2, an exemplary block diagram of one embodiment of a circuit that includes a clock-gated cone of logic is shown. Circuit 200 includes a signal of interest coupled to the input of an inverter 201. The output of the inverter 201 is coupled to one input of the AND-gate 203, the output of which is coupled to one input of another AND-gate 205, which is in turn coupled to the data input of the clocked storage element (i.e., flip-flop (FF)) 207. The signal of interest is also coupled to one input of an OR-gate 209, the output of which is coupled to the inverting input of an AND-gate 211. The output of the AND-gate 211 is coupled to the enable input of the clock gate device 213. The output of the clock gate device (e.g., EnCLK) is coupled to the clock input of the FF207. The inputs to the various gates in FIG. 2 would be connected to other signals but are shown here as unconnected for simplicity.

As shown in the exploded view of the embodiment of FIG. 2, the clock-gating device 213 includes an AND-gate 217 and a latch 215. The latch 215 is configured to latch the enable signal when the CLK signal transitions to a low logic level.

In the circuit 200, the signal of interest propagates through the inverter 201, AND-gate 203, and AND-gate 205. Accordingly it is in the input data cone of logic of the FF207. In addition, because the signal of interest also propagates through OR-gate 209, AND-gate 211, and the clock gate device 213 to the clock input of FF207, the signal of interest is in the cone of logic of the clock gate circuit. This means that the signal of interest gates itself. As described in greater detail below in conjunction with the description of FIG. 3, the signal of interest is redundant in the input data cone of logic of the FF207. Accordingly, it may be removed or disconnected from the input data cone of logic without affecting the function of the circuit, since any remaining inputs are preserved. As shown by the 'X', the signal of interest may be cut and the input to the AND-gate 203 may be tied to VDD, thereby allowing the remaining inputs to the data cone of logic to operate normally. This completely removes the signal path from inverter 201 to the FF 207. In addition, since the output of the inverter 201 has been cut, in cases where this is the only fanout from the inverter 201, the inverter 201 may be removed as well. By removing the unused gate from the signal path, the capacitance on that signal is lower and so the signal load may be reduced, thereby speeding up the signal path through OR-gate 209 and AND-gate 211, etc. It is noted that although the signal of interest is described as passing through various logic gates, it is contemplated that the actual signal name, as identified in a netlist, may change as it passes through the gates or nodes. However, the signal is still considered to be the signal of interest, regardless of its net name.

Figure 3:
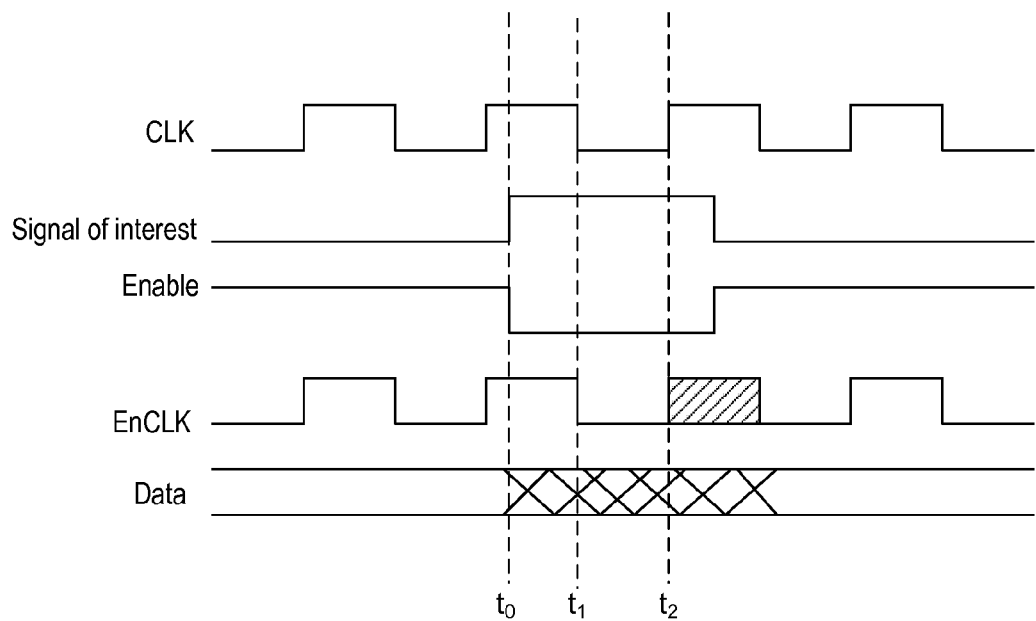
FIG. 3 is a timing diagram depicting the circuit timing of the circuit embodiment shown in FIG. 2.

Referring to FIG. 3, a timing diagram depicting the circuit timing of the circuit embodiment shown in FIG. 2 is shown. Beginning at the top, the timing diagram includes the following signals: CLK, signal of interest, Enable, EnCLK, and Data. As shown the CLK signal is a free-running clock. The signal of interest is an active high signal which goes high at $t_0$, just after the second rising edge of CLK. The Enable signal is essentially a mirror image of the signal of interest due to the negated input of AND-gate 211.

As shown, when enabled by the enable signal, the EnCLK signal is essentially the CLK signal. More particularly, when the enable signal is high the CLK signal is passed through to the output of the clock gate device 213, and when the enable signal is low the CLK signal is gated and there is no EnCLK signal at the output of clock gating device 213. As mentioned above, the Enable signal is latched when the CLK signal is low.

Accordingly, at $t_1$ the CLK transitions to a low logic level while the Enable signal is low. Upon the next rising edge of CLK at $t_2$ the CLK signal is gated at the AND-gate 217 since Enable is low. Accordingly, there is no EnCLK edge (shaded) where the third rising edge of the EnCLK signal would be. Because there is no EnCLK edge, the data input would not be captured by the FF207.

Looking back at the signal of interest and how it propagates though the input data cone of logic of FF207 in FIG. 2, it can be seen that when the signal of interest is asserted high, it forces the output of AND-gate 203 to a logic zero, thus effectively gating the other signals feeding the input data cone of logic of FF207. This is redundant because the clock-gating device 213 prevents the FF207 from capturing the data when the signal of interest is active, so there is no need to have the signal of interest in the input data cone of logic. This redundant signal may be removed without affecting the operation of the circuit.

Figure 4:
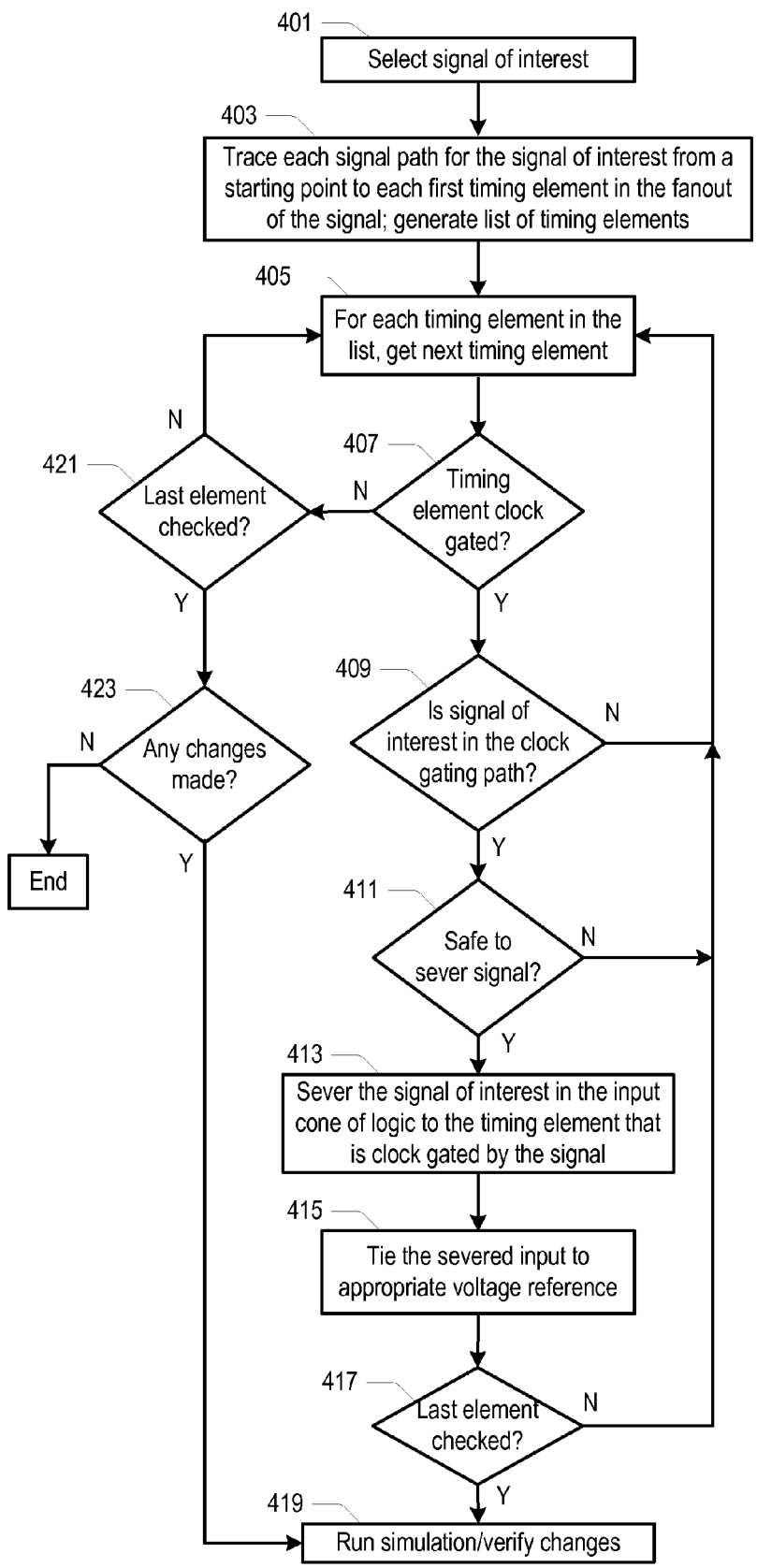
FIG. 4 is a flow diagram depicting an embodiment of a method for identifying a signal that gates itself.

Turning to FIG. 4, a flow diagram depicting an embodiment of a method for identifying self-gating signals is shown. Beginning in block 401 a signal of interest may be selected from the myriad of signals in the netlist. In one embodiment, the signal of interest may be a signal that has been identified by a timing analyzer tool during a static timing analysis for a variety of reasons. For example, the signal of interest may have been identified as missing timing, or it may have been identified as a critical path with a high fanout, or both. Thus, the signal of interest may simply be a starting point on a path.

Regardless of how the signal is selected, once the signal of interest is selected, the signal may be traced forward from an origin point or source in the netlist to each clocked state element such as a flip-flop in each path of the fanout (block 403). A listing of the flip-flop instances may be created. In one embodiment, the list may include the first clocked state element in each path, while in other embodiments the list may include second, third, and more clocked state elements in each path, as desired. Starting at the beginning of the list, the clock path of each of flip-flop may be analyzed to determine if there is clock gating (block 405). If there is no clock gating (block 407), and this is not the last element to be checked (block 419), the next flip-flop is analyzed (block 405).

However, if the flip-flop clock path includes clock gating (block 407), the clock gating path cone of logic is analyzed to determine if the signal of interest feeds into the clock-gating cone of logic (block 409). If the signal of interest is not in the clock-gating path, the next flip-flop is analyzed as described above in block 405. However, referring back to block 409, if the signal of interest is in the clock gating cone of logic, a determination is made as to whether the signal of interest may be severed from the input data cone of logic in the netlist without causing a change in the logic function. If the signal cannot be severed safely (block 411), the next flip-flop is analyzed as described above in block 405. Referring back to block 411, if the signal can be severed safely the netlist is modified so that the signal of interest is severed from the input data cone of logic (block 413). The now floating input that was connected to the signal of interest is tied to an appropriate reference voltage as described above, for example (block 415). If the current flip-flop is not the last one in the list (block 417), the next flip-flop is analyzed as described above in block 405. Alternatively, at any point after a signal is removed or severed, the designer may opt to go back and verify the change through simulation/timing analysis, and/or formally verifying the logic. However, if the current clocked state element is the last one in the list (block 417), the design may be simulated again to verify that the changes to the netlist have the desired effect (block 419). More particularly, if there was a timing issue with that timing path, a static timing analysis may be performed to determine if the path now meets timing. In addition, to ensure that the modified circuit is functionally equivalent to the unmodified circuit, a formal verification or equivalence tool may be run.

Referring back to block 407, if there is no clock gating and this is not the last element to be checked (block 421), the next flip-flop is analyzed (block 405) and the process continues as described above. However, if there is no clock gating (block 407), and this is the last element to be checked (block 421), and there were previous changes made to the netlist (block 423), the process proceeds as described above in conjunction with the description of block 419, in which the changes to the netlist may be verified. Lastly, if there is no clock gating (block 407), and this is the last element to be checked (block 421), and there were no changes made that have not been simulated and/or verified (block 423), the process is complete.

It is noted that in one embodiment, to identify and correct signals of interest that are self-gating, the netlist may be reviewed and modified either manually or in an automated way. For example, in one embodiment the netlist may be reviewed by inspection by a person. In another embodiment, a circuit design tool may be used to automate all or a portion of the process. As described further below, an integrated circuit design tool is described that may be used to automate the process as described above in conjunction with the description of FIG. 4

Figure 5:
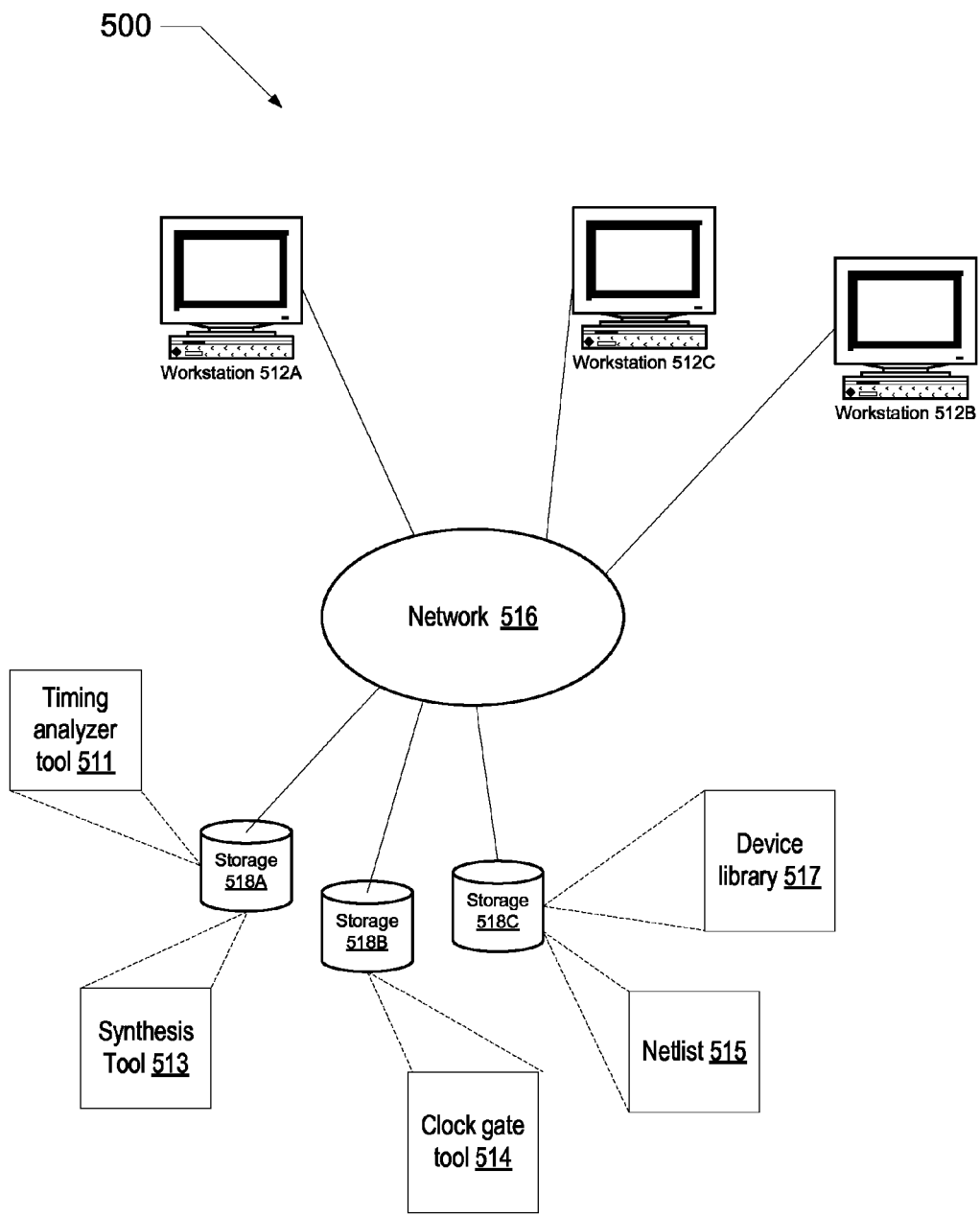
FIG. 5 is a block diagram of one embodiment of a computer system used to implement an IC design tool for identifying a signal that gates itself.

Turning to FIG. 5, a block diagram of one embodiment of a computer system used to implement an IC design tool is shown. Computer system 500 includes a plurality of workstations designated 512A through 512C. The workstations are coupled together through a network 516 and to a plurality of storages designated 518A through 318C. In one embodiment, each of workstations 512A-512C may be representative of any standalone computing platform that may include, for example, one or more processors, local system memory including any type of random access memory (RAM) device, monitor, input output (I/O) means such as a network connection, mouse, keyboard, monitor, and the like (many of which are not shown for simplicity).

In one embodiment, storages 518A-518C may be representative of any type of non-transitory computer readable storage device such as hard disk systems, optical media drives, tape drives, ram disk storage, and the like. As such, the program instructions comprising the design tools may be stored within any of storages 518A-518C and loaded into the local system memory of any of the workstations during execution. As an example, as shown in FIG. 5, a timing analyzer tool 511 and a logic synthesis tool 513 are shown stored within storage 518A, while the netlist 515 and the device library 517 are stored within storage 518C. Further, the clock gate tool 514 is stored within storage 518B. Additionally, the program instructions may be stored on a portable/removable storage media. The program instructions may be executed directly from the removable media or transferred to the local system memory or mass storages 518 for subsequent execution. As such, the portable storage media, the local system memory, and the mass storages may be referred to as non-transitory computer readable storage mediums. The program instructions may be executed by the one or more processors on a given workstation or they may be executed in a distributed fashion among the workstations, as desired.

In one embodiment, the clock gate tool 514 may be used to select signals of interest from the netlist 515 and to create a list of clocked state elements in the paths of each signal of interest. In addition, the clock gate tool 514 may be used to determine whether each clocked state element is clock gated, and if the signal of interest is in the clock gate path. Lastly, the clock gate tool 514 may be used to identify appropriate locations in the cone of logic of a given clocked state element to sever the signal of interest. In a further embodiment, the clock gate tool 514 may be configured to modify the netlist based upon the identification of appropriate locations in the cone of logic of a given clocked state element to sever the signal of interest. In one embodiment, the clock gate tool 514 may include program instructions written in any of a variety of programming languages or scripting languages, and which may be executable by a processor to perform the above tasks.

It is noted that although the computer system shown in FIG. 5 is a networked computer system, it is contemplated that in other embodiments, each workstation may also include local mass storage. In such embodiments, the program instructions and the results of the design tools may be stored locally. Further, it is contemplated that the program instructions may be executed on a standalone computer such as a personal computer that includes local mass storage and a system memory.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method comprising:
   determining, by a processor, whether a given input to a logic circuit is coupled to both an input of a cone of logic that is coupled to a data input of a clocked state element and a clock gate circuit that is coupled to disable a clock input to the clocked state element; and
   in response to determining that the given input is coupled to both the input of the cone of logic and the clock gate circuit:
       removing the given input from the cone of logic such that the given input is no longer coupled to the input of the cone of logic coupling a reference voltage to the input of the cone of logic that was previously coupled to a signal path for the given input; and
       preserving the given input to the clock gate circuit such that the given input continues to be coupled to the clock gate circuit after being removed from the input of the cone of logic.

2. The method as recited in claim 1, further comprising preserving any remaining inputs to the cone of logic such that any remaining inputs continue to be coupled to the cone of logic after the given input is removed from the input of the cone of logic.

3. The method as recited in claim 1, further comprising tracing the signal path for the given input forward from an origin point in a netlist representation of the logic circuit to each clocked state element in each signal path of the fanout of the given input, and determining whether any of the clocked state elements in the fanout are clock gated.

4. The method as recited in claim 3, further comprising determining whether the signal path for the given input is an input to a clock gate circuit that is coupled to any of the clocked state elements in the fanout.

5. The method as recited in claim 3, further comprising deleting a signal name corresponding to the given input from the netlist representation of the logic circuit at an input pin of the input of the cone of logic.

6. A non-transitory computer readable storage medium including program instructions executable by a processor to:
   determine whether a given input to a logic circuit is coupled to both an input of a cone of logic that is coupled to a data input of a clocked state element and a clock gate circuit that is coupled to disable a clock input to the clocked state element; and
   in response to determining that the given input is coupled to both the input of the cone of logic and the clock gate circuit the program instructions are further executable by the processor to:
      remove the given input from the cone of logic such that the given input is no longer coupled to the input of the cone of logic coupling a reference voltage to the input of the cone of logic that was previously coupled to a signal path for the given input; and
      preserve the given input to the clock gate circuit such that the given input continues to be coupled to the clock gate circuit after being removed from the input of the cone of logic.

7. The non-transitory computer readable storage medium as recited in claim 6, wherein the program instructions are further executable by the processor to preserve any remaining inputs to the cone of logic such that any remaining inputs continue to be coupled to the cone of logic after the given input is removed from the input of the cone of logic.

8. The non-transitory computer readable storage medium as recited in claim 6, wherein the program instructions are further executable by the processor to trace the signal path for the given input forward from an origin point in a netlist representation of the logic circuit to each clocked state element in each signal path of the fanout of the given input, and to determine whether any of the clocked state elements in the fanout are clock gated.

9. The non-transitory computer readable storage medium as recited in claim 8, wherein the program instructions are further executable by the processor to replace a signal name corresponding to the given input with the reference voltage at an input pin of the input of the cone of logic.

10. A system comprising:
    a processor;
    a memory coupled to the processor, wherein the memory is configured to store program instructions executable by the processor;
    wherein in response to executing the program instructions, the processor is configured to:
       determine whether a given input to a logic circuit is coupled to both an input of a cone of logic that is coupled to a data input of a clocked state element and a clock gate circuit that is coupled to disable a clock input to the clocked state element; and
       in response to determining that the given input is coupled to both the input of the cone of logic and the clock gate circuit the program instructions are further executable by the processor to:
          remove the given input from the cone of logic such that the given input is no longer coupled to the input of the cone of logic coupling a reference voltage to the input of the cone of logic that was previously coupled to a signal path for the given input; and
          preserve the given input to the clock gate circuit such that the given input continues to be coupled to the clock gate circuit after being removed from the input of the cone of logic.

11. The system as recited in claim 10, wherein the processor is further configured to trace the signal path for the given input forward from an origin point in a netlist representation of the logic circuit to each clocked state element in each signal path of the fanout of the given input, and to determine whether any of the clocked state elements in the fanout are clock gated.

12. The system as recited in claim 10, wherein the processor is further configured to replace a signal name corresponding to the given input with the reference voltage at an input pin of the input of the cone of logic.

* * * * *